(12) United States Patent
Bhattacharya et al.

(10) Patent No.: US 8,510,432 B2
(45) Date of Patent: Aug. 13, 2013

(54) DISTRIBUTED METHODOLOGY FOR APPROXIMATE EVENT COUNTING

(75) Inventors: Partha Bhattacharya, Cupertino, CA (US); Sheng Chen, Stanford, CA (US); Hongbo Zhu, Fremont, CA (US)

(73) Assignee: Accelops, Inc., Santa Clara, CA (US)

( * ) Notice: Subject to any disclaimer, the term of this patent is extended or adjusted under 35 U.S.C. 154(b) by 377 days.

(21) Appl. No.: 12/822,842

(22) Filed: Jun. 24, 2010

(65) Prior Publication Data

US 2010/0332652 A1 Dec. 30, 2010

Related U.S. Application Data

(60) Provisional application No. 61/220,820, filed on Jun. 26, 2009.

(51) Int. Cl.
*G06F 15/173* (2006.01)

(52) U.S. Cl.
USPC .......................................................... 709/224

(58) Field of Classification Search
USPC .................................................. 709/218, 224
See application file for complete search history.

(56) References Cited

U.S. PATENT DOCUMENTS

| | | | |
|---|---|---|---|
| 6,167,448 A | 12/2000 | Hemphill et al. | |
| 6,226,675 B1 | 5/2001 | Meltzer et al. | |
| 6,606,620 B1 | 8/2003 | Sundaresan et al. | |
| 6,633,835 B1 | 10/2003 | Moran et al. | 702/190 |
| 6,718,371 B1 | 4/2004 | Lowry et al. | |
| 7,016,751 B2 | 3/2006 | Nordquist et al. | |
| 7,072,886 B2 | 7/2006 | Salmenkaita et al. | |
| 7,114,123 B2 | 9/2006 | Chen et al. | |
| 7,421,648 B1 | 9/2008 | Davis | |
| 7,698,694 B2 | 4/2010 | Tjong et al. | |
| 7,779,398 B2 | 8/2010 | Tjong et al. | |
| 2002/0169825 A1 | 11/2002 | Hougland et al. | |

(Continued)

FOREIGN PATENT DOCUMENTS

| | | |
|---|---|---|
| GB | 2402520 A | 12/2004 |
| WO | WO 01/52496 A2 | 7/2001 |
| WO | WO 2004/061550 A2 | 7/2004 |

OTHER PUBLICATIONS

Bhattacharya, U.S. Appl. No. 12/722,416, Mar. 11, 2010, Notice of Allowance mailed Nov. 28, 2011, 10 pgs.

(Continued)

*Primary Examiner* — Ruolei Zong
*Assistant Examiner* — David X Yi
(74) *Attorney, Agent, or Firm* — Morgan, Lewis & Bockius LLP

(57) ABSTRACT

In a method and system for aggregating event information, events are received at a first plurality of nodes in a distributed system. For the events received at each node aggregated attribute information is determined in accordance with two or more rules and stored in distinct first tables, each table storing aggregated attribute information for a respective rule of the two or more rules. At each node of the first plurality of nodes, the two or more distinct first tables are transmitted to a respective node of a second set of nodes in the distributed system. At each node of the second set of nodes, two or more distinct second tables are generated by merging the aggregated attribute information in the tables transmitted to the node. Each rule of the two or more rules is evaluating using the aggregated attribute information obtained from a corresponding table of the second tables.

27 Claims, 18 Drawing Sheets

(56) References Cited

U.S. PATENT DOCUMENTS

| | | | |
|---|---|---|---|
| 2005/0206650 A1 | 9/2005 | Nazzal | 345/594 |
| 2005/0289219 A1 | 12/2005 | Nazzal | 709/203 |
| 2006/0117307 A1 | 6/2006 | Averbuch et al. | |
| 2007/0043703 A1* | 2/2007 | Bhattacharya et al. | 707/3 |
| 2007/0050704 A1 | 3/2007 | Liu | 715/513 |
| 2007/0169038 A1 | 7/2007 | Shankar et al. | 717/143 |
| 2007/0240034 A1 | 10/2007 | Sthanikam et al. | |
| 2007/0250823 A1 | 10/2007 | Kono | |
| 2008/0209007 A1* | 8/2008 | Gurecki et al. | 709/218 |
| 2008/0275916 A1 | 11/2008 | Bohannon | 707/200 |
| 2009/0006944 A1 | 1/2009 | Dang et al. | |
| 2009/0063391 A1 | 3/2009 | Zhou et al. | 706/59 |

OTHER PUBLICATIONS

Xu et al., "XML Based RFID Event Management Framework," IEEE, 2006, 4 pgs.

Banmazemi et al., *Storage-Based Intrusion Detection for Storage Area Networks (SANs)*, Proc. of the 22nd IEEE / 13th NASA Goddard Conference of Mass Storage Systems and Technologies, (MSST '05), Apr. 11-14, 2005, Monterey, CA, 10 pgs.

International Search Report and Written Opinion, PCT/US2010/027124, Jul. 2, 2010, 7 pgs.

International Search Report and Written Opinion, PCT/US2010/039913, Apr. 28, 2011, 17 pgs.

\* cited by examiner

506 — In each table of a plurality of distinct tables, each table having an associated distinct hash function, aggregated attribute information is stored in rows determined by the hash function corresponding to the table

518 — Each table includes a number of sub-tables, the number of sub-tables corresponds to a number of predetermined time increments for a time window, each sub-table corresponds to a distinct time increment in the time window; and each sub-table stores aggregated attribute information corresponding to the time increment in the time window.

520 — The time window is greater than one minute.

522 — Aggregated attribute information is stored in sub-tables corresponding to a new time window in response to determining that a time window has expired.

FIGURE 5B

510 — When the intermediate results for each table indicate a violation of the rule, it is determined if the intermediate result indicating a rule violation indicated a rule violation for each table corresponds to a same group of events

516 — With respect to the rows of tables for which the intermediate results indicate a rule violation, it is determined whether every one of the tables in the plurality of tables has a row for which the intermediate result indicates a rule violation and which corresponds to the same group of received events.

517 — When every one of the tables in the plurality of tables has a row for which the intermediate results indicate a potential rule violation, identify events (event data) corresponding to the row in each of the tables for which the intermediate results indicates a potential rule violation, and determine if the rule is violated by the identified events.

FIGURE 5H

DISTRIBUTED METHODOLOGY FOR APPROXIMATE EVENT COUNTING

RELATED APPLICATIONS

This application claims priority to U.S. Provisional Patent Application Ser. No. 61/220,820, filed Jun. 26, 2009, entitled "Distributed Methodology for Approximate Event Counting," which is incorporated herein by reference in its entirety.

TECHNICAL FIELD

The disclosed embodiments relate generally to managing a computer system by processing and counting event messages, produced by devices within the computer system, so as to determine the status of various aspects of the computer system.

BACKGROUND

Event messages produced by the devices in a computer system, such as a computer center or server system, are used to monitor and manage computer systems and networks. In addition to reporting the health of network devices, hosts and servers, event messages also report on activities, such as network traffic, observed by the devices in a computer system. The counts of various event messages can be correlated to detect system conditions and/or predict problems.

Typically, the counting of event messages produced by the devices in a computer system is done at a single node. However, a single node may not have adequate memory capacity to store counts of event attributes that have large ranges. For example, Internet Protocol version 4 has over 4 billion unique addresses and Internet Protocol version 6 has $2^{128}$ unique addresses. In addition, a single node may not have the processing capacity to count and analyze events that are received at a high rate. Also, event messages that are generated at geographically disparate locations may make it infeasible to aggregate event processing at a single node due to bandwidth and storage limitations.

SUMMARY

According to some embodiments, in a computer-implemented method for collecting event information, events having attributes are received. Event information for at least one attribute in a corresponding set of the received events is aggregated in accordance with a rule for detecting a system condition. Aggregated attribute information is stored in a plurality of tables in rows determined by a distinct hash function associated with each table. A plurality of intermediate results, including respective results for each table, is generated by evaluating the rule separately with respect to each table. When the intermediate result for each table indicates a violation of the rule, additional processing is performed to determine whether the intermediate results correspond to the same group of events and a report is produced in accordance with the determination.

According to some embodiments, in a computer-implemented method for collecting event information, events having attributes are received at a first plurality of nodes in a distributed system. For the events received at the first plurality of nodes, aggregated attribute information is determined in accordance with the event attributes of the received events corresponding to two or more rules. The aggregated attribute information is stored in two or more distinct first tables, each table storing aggregated attribute information for a respective rule of the two or more rules. At each node of the first plurality of nodes, the two or more distinct first tables are transmitted to a respective node of a second set of nodes in the distributed system. At each node of the second set of nodes, two or more distinct second tables are generated by merging the aggregated attribute information in the tables transmitted to the node. Each rule of the two or more rules is evaluated using the aggregated attribute information obtained from a corresponding table of the second tables.

According to some embodiments, instructions to perform the aforementioned operations may be included in one or more modules stored in memory and configured for execution by one or more processors.

BRIEF DESCRIPTION OF THE DRAWINGS

FIGS. 5A-5H are flow chart diagrams for the process of aggregating event information and triggering rules, in accordance with some embodiments of the invention.

Like reference numerals refer to corresponding parts throughout the drawings.

DESCRIPTION OF EMBODIMENTS

Figure 1A:
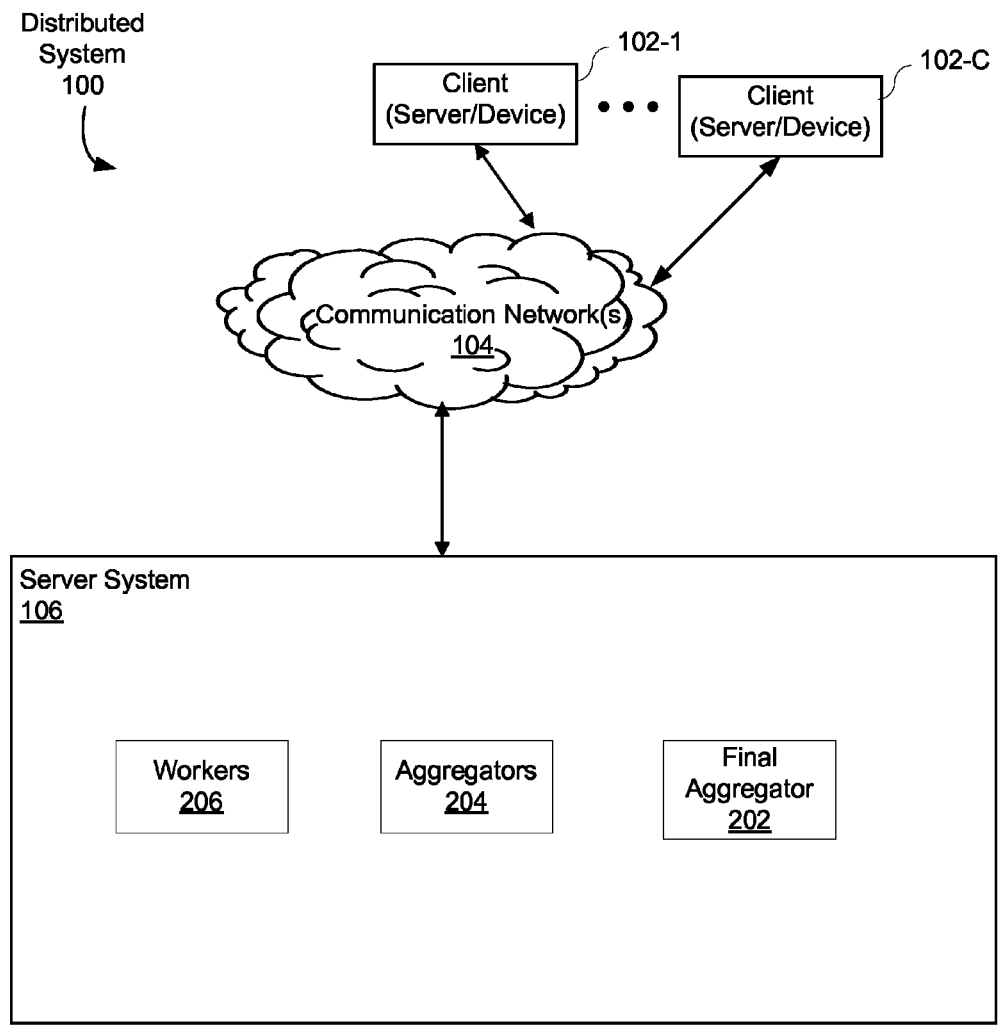
FIGS. 1A-1C are block diagrams illustrating the distributed system, in accordance with some embodiments of the invention.

FIG. 1A is a block diagram of distributed system 100 for implementing some of the embodiments of the invention. One or more client or server devices 102 are connected to a communication network 104, which is also connected to a server system 106. The server system 106 can include worker server systems 206, aggregator server systems 204 and a final aggregator server system 202. The client/server devices 102 may be any suitable computer devices that are capable of connecting to the communication network 104, such as routers, switches, firewalls, relay servers, application servers, and servers for managing the operations of other computers or devices in the distributed system 100. Optionally, the client/server 102 devices may include other computers, such as desktop and/or laptop computers used by managers of the distributed system 100. In some embodiments, the distributed system 100 is, or includes, a data center providing servers to a community of users, and thus includes application servers as well as the devices required to support those servers, management of the system 100, and communications with computers and devices outside the system 100.

The communication network 104 can be any local area network (LAN) and/or wide area network (WAN), such as an intranet, an extranet, or the Internet. It is sufficient that the communication network 104 provides communication capability between the clients/server devices 102 and the server system 106.

The term "events" is used herein to mean event messages, objects, or other data structures containing event information.

Figure 1B:
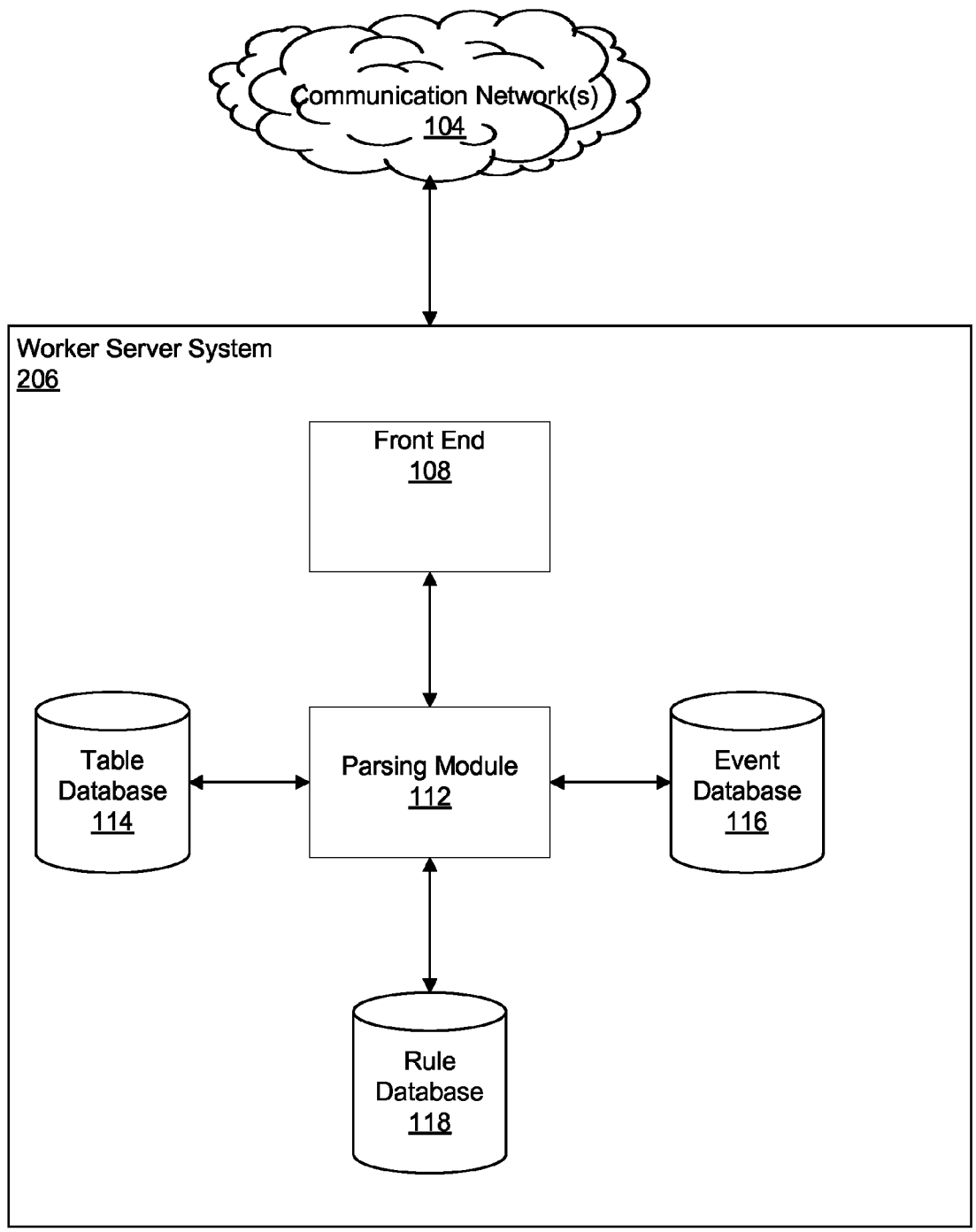

FIG. 1B is a block diagram of a worker server system 206, in accordance to some embodiments of the invention. The worker server system 206 can include a front end 108, a table database 114, a parsing and initial aggregation module 112, an event database 116, and a rule database 118.

The front end 108 is configured to receive events from client/server devices 102. The parsing and initial aggregation module 112 is configured to use two or more rules, stored in the rule database 118, and received events from the front end 108 to produce aggregated attribute information (also called aggregated event information) for the received events. In some embodiments, the aggregated attribute information for the received events is stored in tables of the table database 114. Each table of the table database 114 includes a distinct hash function used to determine the row in which to aggregate attribute information. The front end 108 is also configured to send copies of at least some of the tables in the table database 114 to other servers in the distributed system 100, including aggregator servers 204 and final aggregator servers 202. In some embodiments, respective events in the received events are received from one or more of the client/server devices 102 described above.

The event database 116 stores event information including, for a respective event, the source IP address, destination IP address, source port, destination port, protocol, source interface, destination interface, file name, source user name, and source computer name. However, in some embodiments the event database 116 stores a subset of the aforementioned information for a respective event (e.g., one or more of the aforementioned parameters may not be available or applicable for some events).

The rule database 118, stores rules for "counting" (i.e., aggregating information for) respective groups of related events. In some embodiments, each rule in the rule database 118 specifies a group-by attribute set and a time window. The group-by attribute set defines a set of aggregation attributes. For example, a group-by attribute set could be a source address and a destination port. A time window defines a period of time. In one example, the time window defines a period of time greater than one minute.

Figure 1C:
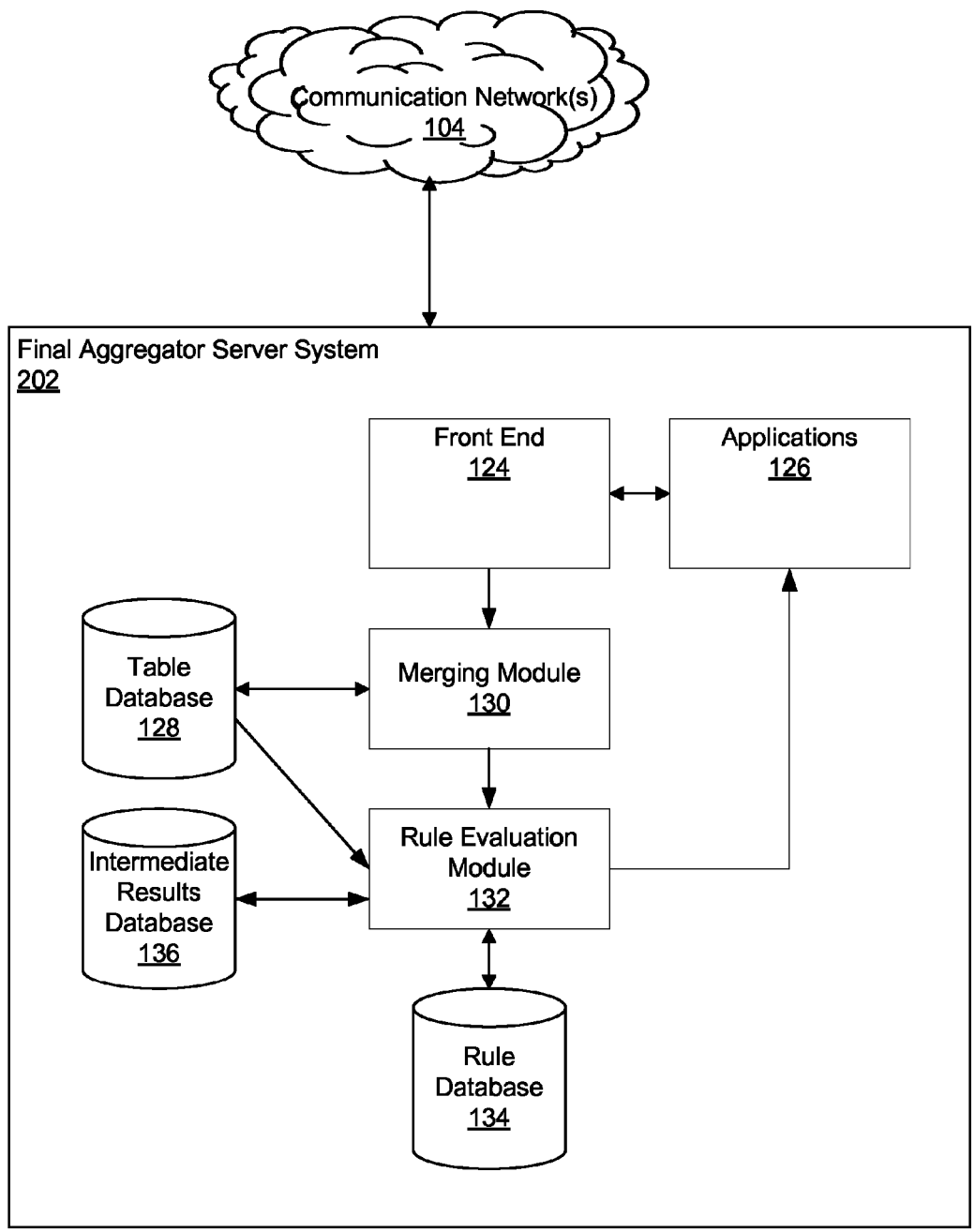

FIG. 1C is a block diagram of a final aggregator server system 202. The final aggregator server system 202 can include a front end 124, a table database 128, a merging module 130, a rule database 134, rule evaluation module 132, intermediate results 136 and applications 126. In some embodiments, an intermediate aggregator server system 204 can include a front end 123, a table database 128, a merging module 130 and a table database 128.

The front end 124 is configured to receive aggregated attribute information from one or more worker server systems 206 or aggregator server systems 204. The aggregated attribute information received by the front end is stored in tables of the table database 128. The merging module 130 is configured to merge aggregated attribute information from two or more tables, stored in the table database 128, to form a table of merged aggregated attribute information. The table of merged aggregated attribute information is stored in the table database 128.

The rule evaluation module 132 is configured to use rules, stored in the rule data base 134, and aggregated attribute information, stored in the table database 128 to produce intermediate results indicating if a rule violation has occurred. In some embodiments, the intermediate results are stored in the intermediate results database 136. In an alternate embodiment, the rule evaluation module 132 is configured to send the intermediate results or notifications to respective applications in the applications 126. In another embodiment, the front end 124 is configured to send the intermediate results to respective applications in the set of applications 110.

The front end 124 is also configured to send requests for event information to the worker server systems 206 or aggregator server systems 204. In some embodiments, the front end 124 for an aggregator server is configured to send tables containing merged aggregated attribute information to a final aggregator system 202.

Applications 126 can include applications such as a network monitoring application that takes intermediate results as input. In some embodiments, the applications 126 include an application that performs an analysis on the intermediate results after they have been generated by the rule evaluation module 132, to determine an operational status of a device or subsystem of the distributed system 100. Alternately, applications may receive notifications of rule violations based on a preliminary analysis of the intermediate results.

As stated above, the rule database 134, stores rules for "counting" (i.e., aggregating information for) respective groups of related events. In some embodiments, each rule in the rule database 134 specifies a group-by attribute set, an aggregation condition and a time window. The group-by attribute set defines a set of aggregation attributes. For example, a group-by attribute set could be a source address and a user name. The aggregation condition defines a Boolean expression of aggregation clauses where each aggregation clause includes an aggregation attribute for which aggregated attribute information is to be stored. For example, an aggregation condition could be that a single source address has failed to login at more than ten distinct destination hosts. A time window defines a period of time. In some embodiments, the time window defines a period of time greater than one minute.

Figure 2:
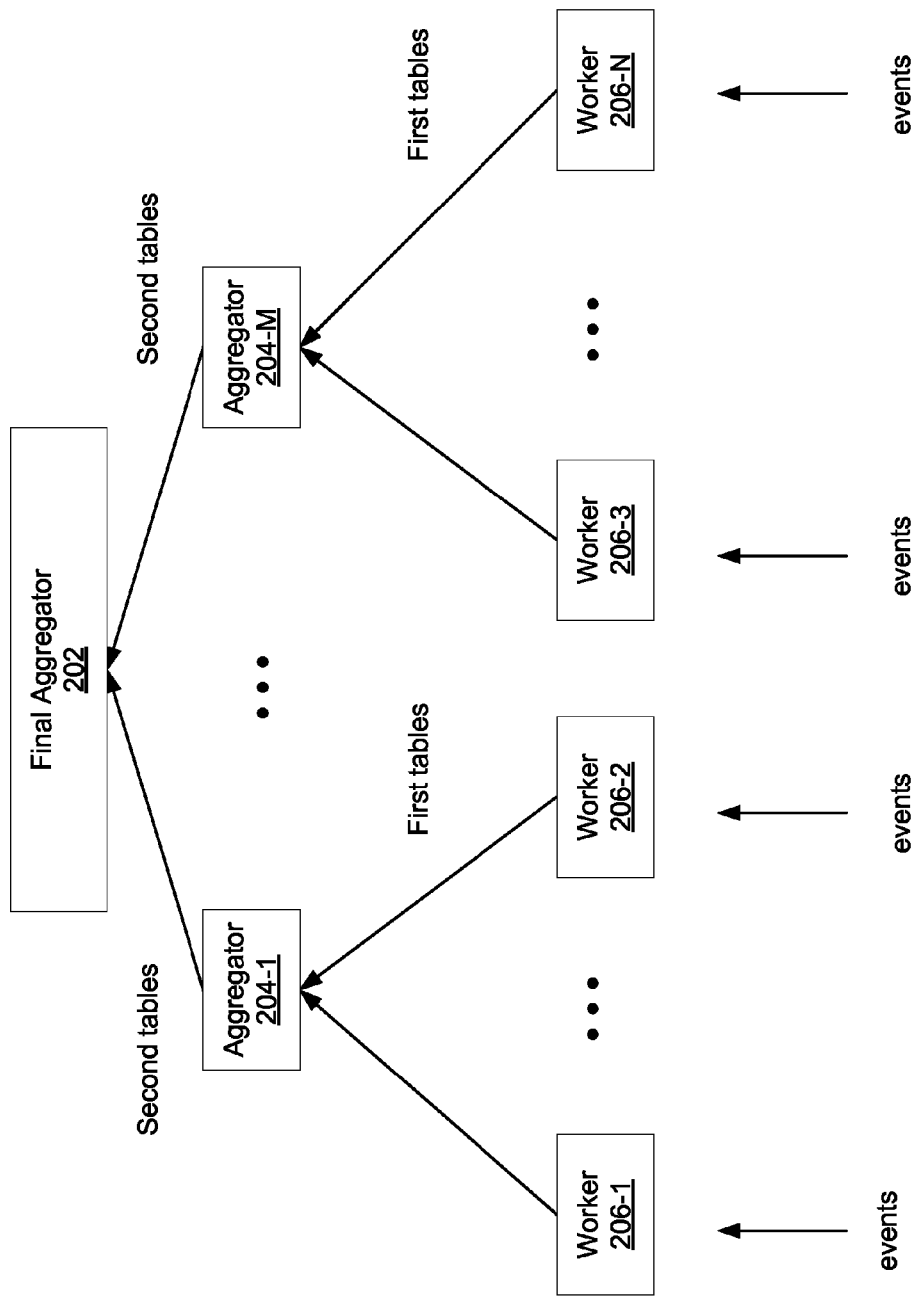
FIG. 2 is a block diagram illustrating a process of aggregating event information in accordance with some embodiments of the invention.

FIG. 2 illustrates the process for processing events and generating aggregated attribute information, in accordance with some embodiments of the invention. Initially, events are received at one or more worker server systems 206-1 to 206-N. Each worker server system 206 creates two or more distinct first tables containing aggregated attribute information for the received events and sends the first tables to one or more aggregator server systems 204 to 204-M. Each aggregator server system 204 generates two or more distinct second tables by merging aggregated attribute information from the first tables and sends the second tables to the final aggregator server system 202. In some other embodiments, each worker server system 206-1 to 206-N sends the first tables containing aggregated attribute information to the final aggregator system 202, in which case the system does not include or use aggregator server systems 204.

Figure 3A:
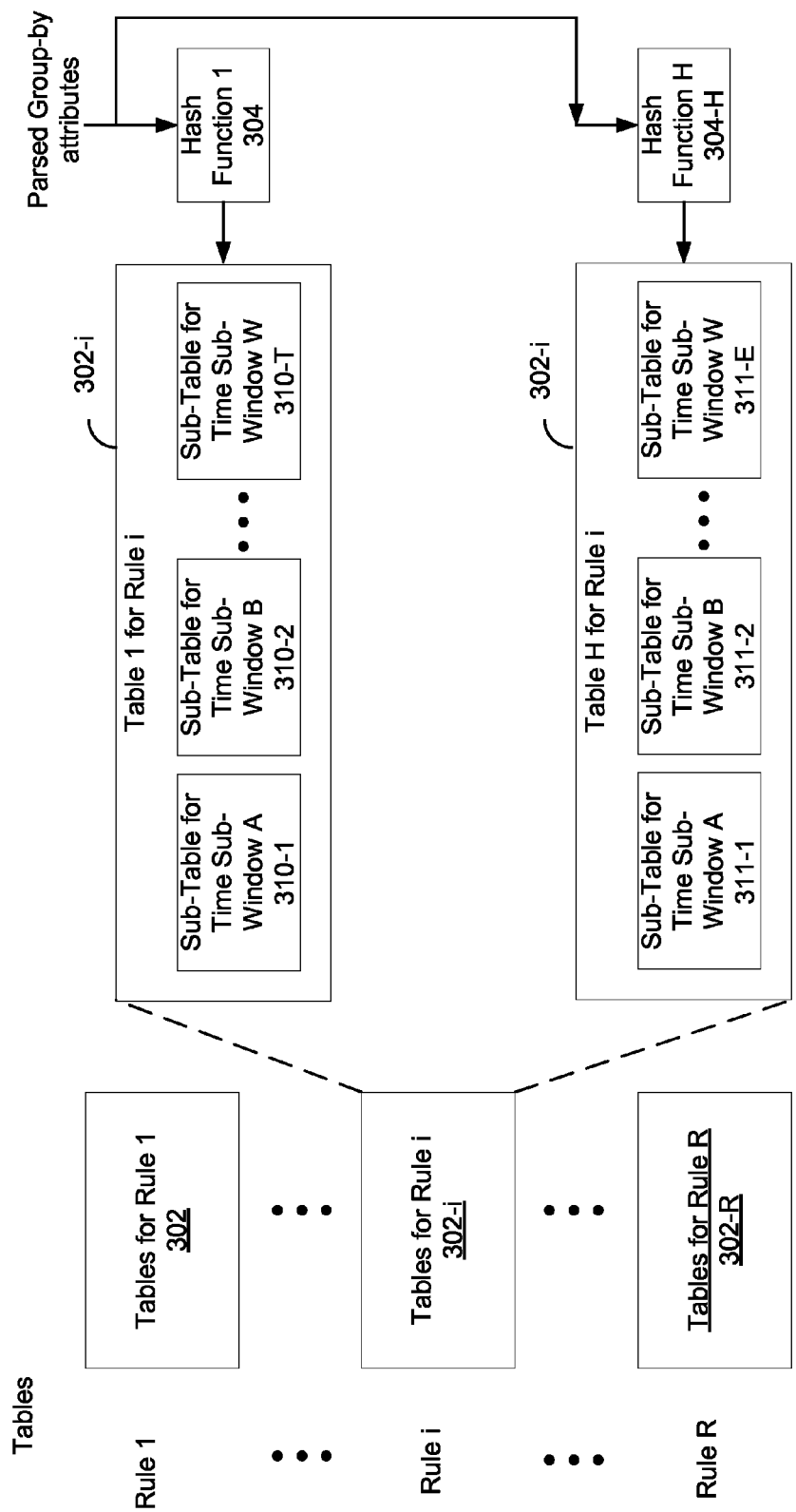
FIGS. 3A-3B are diagrams illustrating tables stored in worker/aggregator nodes, in accordance with some embodiments of the invention.

FIG. 3A illustrates tables stored on worker nodes 206, aggregator nodes 204, and final aggregators 202, in accordance to some embodiments of the invention. Each node stores a set of rules used for aggregating event attribute information. Each rule has multiple corresponding tables 302-1 to 302-R and each table has multiple sub-tables 310 to 310-T corresponding to successive time windows. In some embodiments, the duration of the time window is defined in the rules. Each table has a corresponding hash function 304 that takes group-by attributes as inputs. For table 302-i the group-by attributes are defined by rule i. The value produced by a hash function 304-i identifies the row of table i in which event data is to be stored.

Figure 3B:
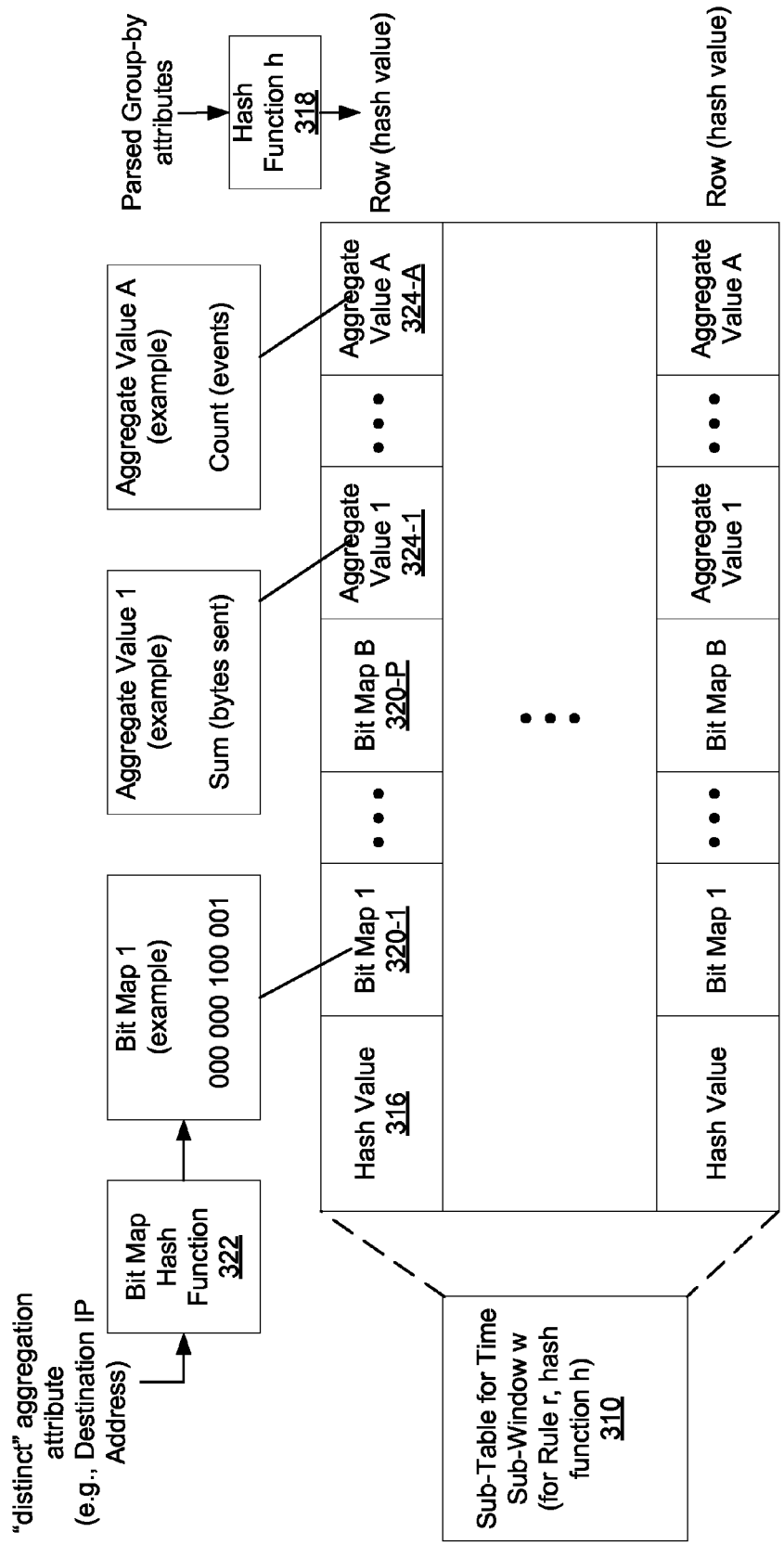

FIG. 3B illustrates rows of a sub-table 310 for a time sub-window w, in accordance to some embodiments of the invention. Each row contains a hash value 316 which is determined by a hash function 318 that takes group-by attributes as input. In some embodiments, the hash value is used to identify each row. Each row of the table also contains one or more bit maps 320-1 to 320-P. The values contained in the bitmaps are defined in the rule r and determined by a bit map hash function 322 that takes as input distinct aggregation attributes (e.g., destination IP addresses of received events). Each row also contains one or more aggregate values 324. In some embodiments, aggregate values are determined from the event attributes. For example, an aggregate value could be the sum of the bytes sent or a count of the events.

Figure 4A:
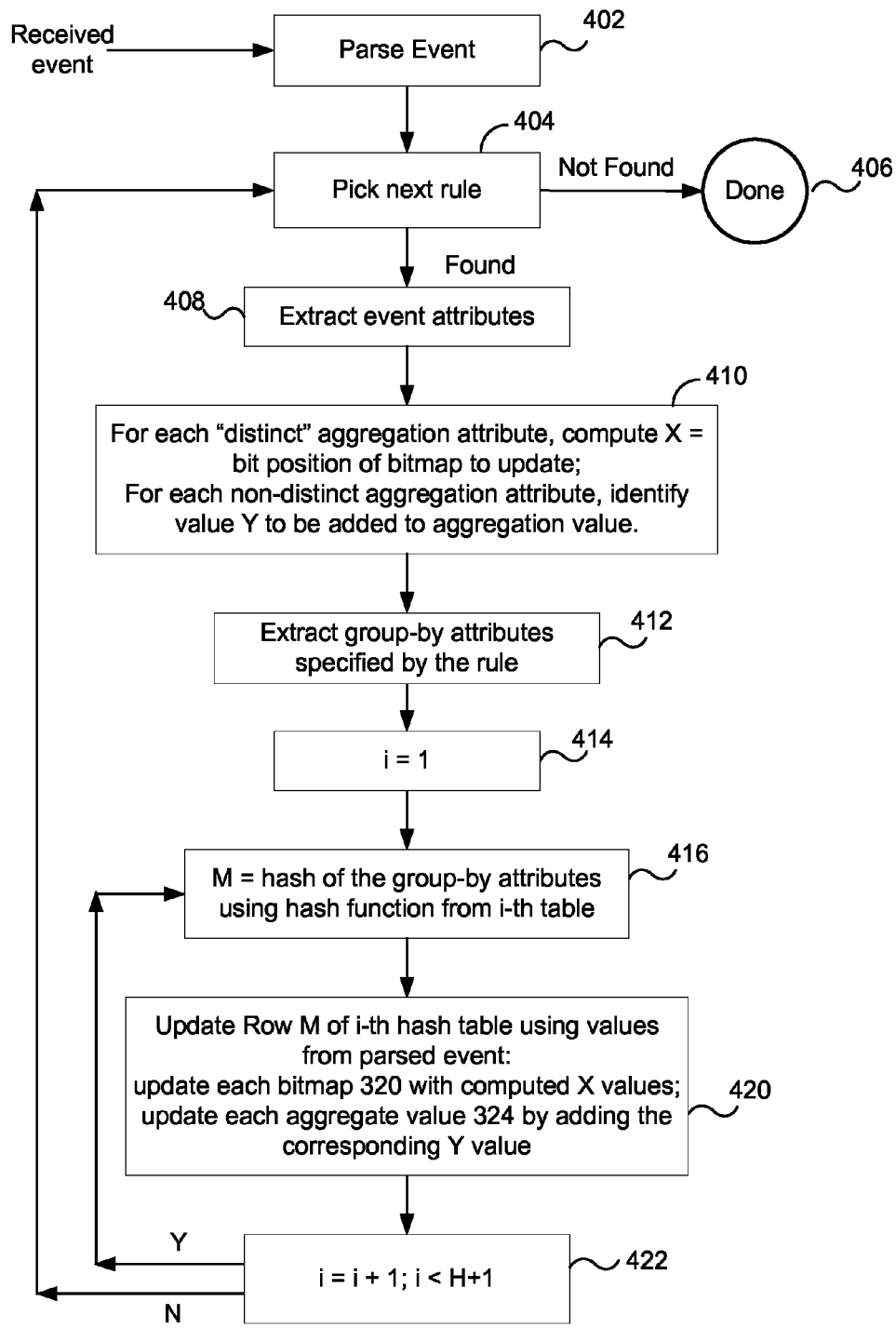
FIGS. 4A-4D are flow chart diagrams illustrating operations of a worker node and a final node, in accordance with some embodiments of the invention.

FIG. 4A illustrates the process of generating aggregated attribute information at a worker node, in accordance to some embodiments. In this process, aggregated attribute information is extracting from received events according to each rule. Tables corresponding to each rule are updated with the aggregated attribute information.

Initially, events are received and parsed at block 402. A rule is selected at block 404. In some embodiments, the rules define event information used to generate aggregated attribute information. For example, a rule may define group-by attributes, an aggregation condition and a time window. The time window defines a period of time. The group-by attribute defines a set of aggregation attributes. For example, a group-by attribute set could be a source address and a user name.

If all the rules applicable to the received event have already been selected and processed, the process finishes at block 406. If a there is at least one rule applicable to the received event that remains to be selected (404, found), a next rule applicable to the received event is selected and then the process proceeds to block 408 where event attributes are extracted in accordance with the selected rule. A bitmap for each distinct aggregated attribute (i.e., each distinct attribute for which aggregated attribute information is determined) is computed at block 410. A distinct aggregated attribute is an attribute with a distinct qualifier. For example, a distinct aggregated attribute could be a source IP address, destination IP address, destination port, protocol, source interface, destination interface, file name, source user name, or source computer name.

At block 412, the group-by attributes specified by the selected rule (selected at block 404) are extracted from the received event. At block 414, a counter value (also called a control variable), i, is initialized to a value of 1. The process then proceeds to generate and store aggregated attribute information in multiple tables. Each table has an associated (i.e., corresponding) hash function, which is applied to the extracted group-by attributes to generate a value M. The value M identifies a row of the table in which event data is to be stored. At block 416, M is set to a hash value generated by applying the hash function associated with the i-th table to the group-by attributes (which were extracted from the received event at block 412).

At block 420, the i-th table is updated at row M with information extracted from the received event. For example, the bit maps 320 (FIG. 3B) for each distinct aggregation attribute are updated by setting a bit in each respective bit map 320. The bit to be set may be determined by applying a hash function (sometimes called the bit map hash function) to the distinct aggregation attribute. In addition, one or more aggregate values 324 (FIG. 3B) in row M are updated with information from the received event. For example, a value extracted from the received event may be added to the value previously stored in a respective aggregate value 324.

The process then moves to block 422, at which the counter value i is incremented by one. If i is less than H+1 (i.e., there are still more tables corresponding to the selected rule) then the process goes to block 416 and computes a new row value M, using the hash function associated with the i-th table, to determine which row is to be updated in the i-th table. It is noted that H is the number of tables corresponding to the rule (see FIG. 3A). Row M of the table is then updated, as described above. If i is not less than H+1 (i.e., there are no more tables to update for the selected rule) then the process go back to block 404 and selects another rule that is applicable to the parsed event.

Figure 4B:
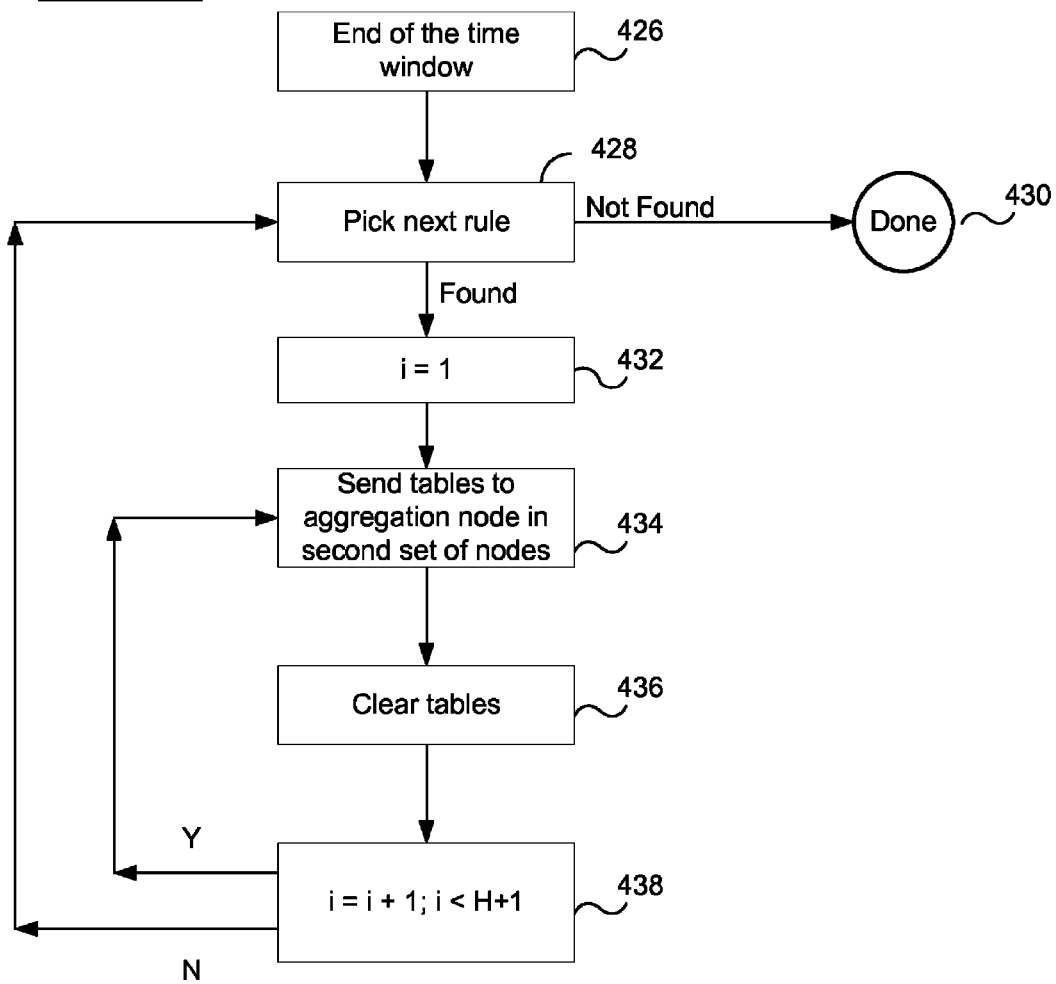

FIG. 4B illustrates a periodic flush of tables contained in a worker node, according to some embodiments of the invention. In this process, all of the tables for each rule are sent to a second set of nodes at the end of a predetermined time window. In some embodiments, the second set of nodes are aggregator servers. In an alternate embodiment, the second set of nodes is the final aggregator node.

Initially, a determination is made that a time window has ended at block 426. In some embodiments, the duration of the time window is defined in a rule stored in rule database 118. At block 428, a rule is selected. In some embodiments, the rule is selected from the rule database 118. If there are no more rules to select then the table flushing process end at block 430. If there is at least one more rule whose tables require flushing, the process moves to block 432 and a counter value i is set to one. At block 434, the i-th table corresponding to the selected rule is sent (e.g., transmitted via a network) to aggregator node in a second set of nodes. After being sent to an aggregator node, the i-th table is cleared at block 436. Next, i is incremented by one at block 438. If i is less than H+1 (i.e., there are still tables corresponding to the rule that have not been sent to an aggregator node in the second set of nodes) then the process goes to block 434 to send the i-th table to an aggregator node in the second set of nodes. If i is not less than H+1 (i.e., all of the tables corresponding to the rule have been sent to an aggregator node in the second set of nodes) then the process goes to block 428 to select another rule.

It is noted that in other embodiments, the operations in the process shown in FIG. 4B may be performed in a different order. For example, the rules may be processed in a different order, the tables for each rule may be processed in the different order, and the time at which tables are cleared may be different (e.g., all the tables transmitted to the aggregator node may be marked for deletion, but not actually cleared until all the tables for a rule (or all the tables for all the rules) have been sent, or until their space is needed.

Figure 4C:
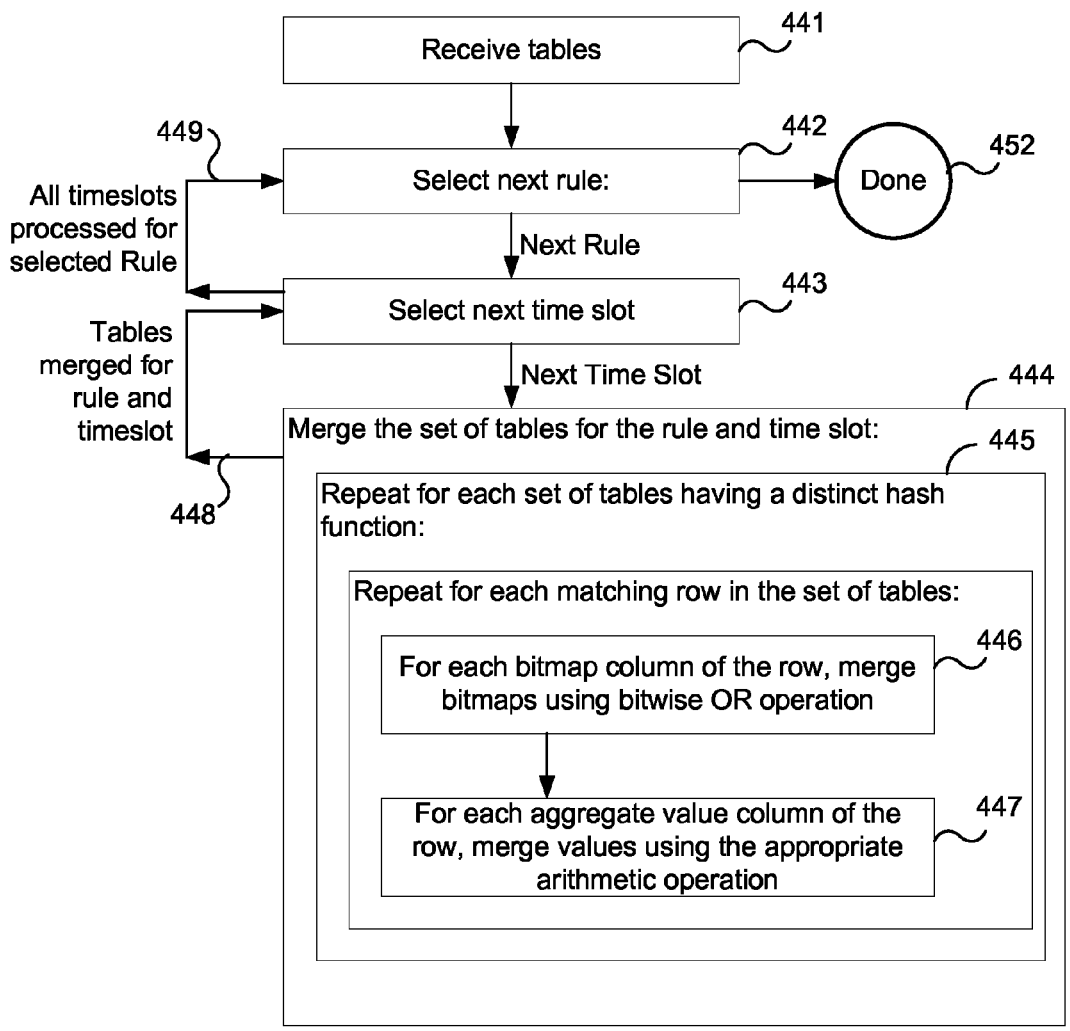

FIG. 4C illustrates the process of merging tables received at an aggregator node 204 or 202, according to some embodiments of the invention. In a three tier system, the process shown in FIG. 4C is performed at intermediate aggregator nodes 204 after receiving tables from two or more worker nodes 206, and is also performed by a final aggregator node 202 after receiving tables from two or more intermediate aggregator nodes 204.

Tables containing aggregated attribute information are received (441). If the receiving node is an intermediate aggregator node 204, the tables are received from two or more worker nodes. If the receiving node is the final aggregator node 202, the tables are received from one or more aggregator nodes 204. Once the tables have been received, tables (typically received from different nodes) that are for the same rule and time slot are merged so as to produce a single set of merged tables for each rule and time slot. The merging process can be viewed as having several nested loops, with an outer loop 442 for selecting each of the rules, a first nested loop 443 for selecting each time slot for which tables have been received, and an inner loop 444 for merging the tables for the selected rule and time slot.

Within the inner loop 444, a sub-loop 445 selects the set of tables (for the selected rule and time slot) that use the same hash function are merged, to produce H merged tables. This set of tables is merged 445, row by row, to produce a single merged table for the selected rule, time slot and hash function. In particular, for each bitmap column of the matching rows in the set of tables, the bitmaps are merged by performing a bitwise OR of the bitmaps from the two or more received tables. For example, if the two bitmaps being merged are 011000 and 001110, the result is 011110. For each aggregate value column of the matching rows in the set of tables, the values are merged by performing the appropriate arithmetic operation. One example of an arithmetic operation for merging aggregate column values is an addition operation. Another example is performing a first mapping operation (e.g., an exponential mapping) to produce intermediate values, summing the intermediate values to produce a sum, and then performing an inverse mapping (e.g., a logarithmic mapping) on the sum to produce the merged aggregate value.

Once all the tables for a particular hash function are merged, the tables for the next hash function are merged, until all the distinct sets of tables for the selected rule and timeslot have been merged (448). At this point a next timeslot, if any, is selected (443), and the tables for the selected rule and timeslot are processed (444) as described above.

Once all the tables for the timeslot have been processed (449), a next rule if any is selected (442). Once all the tables for all the rules have been processed, the merging process is complete (452).

In other embodiments, the nesting of the loops could be different than shown in FIG. 4C. For example, the outer loop could select the time slot, and the next loop could select the rule. The resulting set of merged tables would be the same, but would be produced in a different order.

Figure 4D:
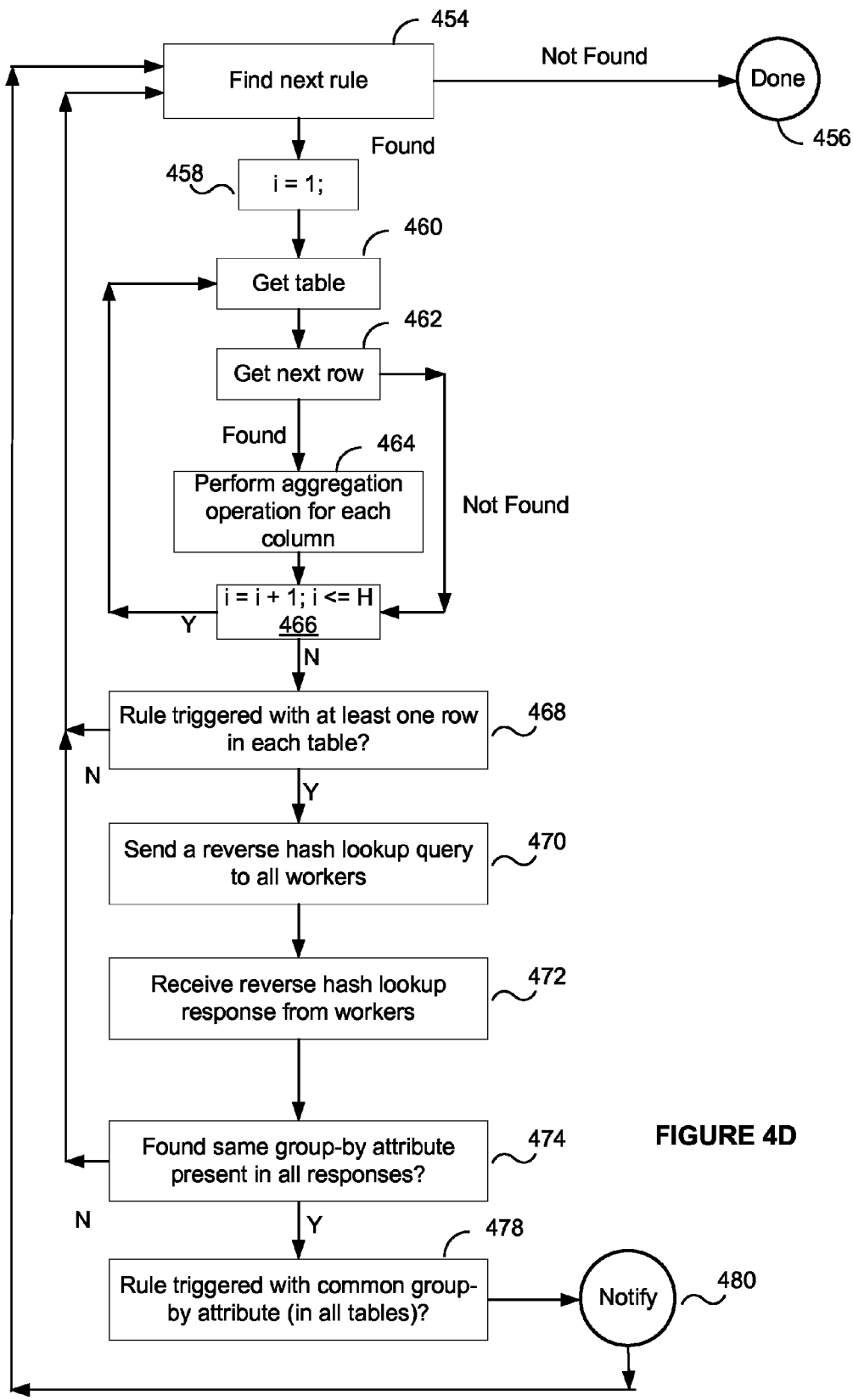

FIG. 4D illustrates a process, performed at a final aggregator node, for determining if any rules are triggered by the received event data, according to some embodiments of the invention. In some embodiments, the triggering of a rule by data in at least one row of every table corresponding to the rule indicates a potential violation of the rule. The triggering of the rule by at least one row in every table (e.g., in all the sub-tables for a single time slot) causes the rule evaluation process to obtain additional information so as to determine if an actual rule violation has occurred.

Initially, a rule is selected (454) and a counter value i is set to 1 (458). A table corresponding to the rule is retrieved (460), and a first or next row of the table is retrieved (462). If a row not previously selected is found, then an aggregation operation (464) is performed for each column in the row. In some embodiments, for some columns (e.g., bitmap columns), the aggregation operation is a sum or count of all the bits. After the aggregation operation, the counter value is incremented by one (466). If i is less then or equal to H (i.e., there are still more tables corresponding to the rule) then the process goes to block 460 to retrieve another table. If i is greater than H (i.e., there are no more tables for the rule) then the process moves to block 468, where it is determined if the currently selected rule was triggered by at least one row in each table.

It is noted that triggering a rule using the data in just one aggregated event table is not a sufficient basis for determining if the rule has been, in fact, violated by a set of events. The aggregation of event data in the tables removes too much information to make a rule violation determination, but if every one of the tables for the rule has at least one row that triggers the rule, then a rule violation is possible. On the other hand, if there is even one table for the rule for which no rows trigger the rule, that this is sufficient for determining that the rule has not been violated.

Therefore, if the currently selected rule is not triggered by at least one row in each table, the process selects a next rule, if any, that has not yet been processed (454) and reviews the data in the tables for the newly selected rule (458-466), as described above. If there are no more rules to select, then the process finishes (456).

If the currently selected rule was triggered by at least one row in each table (468-Y), a number of operations are performed to determine if the rule has in fact been violated. In particular, the process sends a reverse hash lookup query to all the worker nodes (470), to obtain the event data corresponding to each row that triggered the rule. Responses to the reverse hash lookup are received from the worker nodes (472) and then the event data in the responses is analyzed to determine whether the same group-by attribute (also called the shared group-by attribute or common group-by attribute) was present in the responses from all the tables (for the specified rule and time slot) in the worker nodes (474). If the same group-by attribute was not present in all the responses from all the tables, the rule was not violated, and therefore the process returns to block 454 to select a next rule, if any. If the same group-by attribute was present in all responses (474-Y) then the process determines (478) whether the rule was triggered with the common group-by attribute value. If the rule was not triggered with a common group-by attribute, the rule was not violated, and the process returns to block 454 to select a next rule, if any. If the rule was triggered with a common group-by attribute value, this means that the rule was violated, and a notification is generated (480). In some embodiments, the notification is sent to one or more applications.

In some other embodiments, violation of at some rules is not fully determined by a positive determination at 480. Instead, after a positive determination at 480, the final determination of a rule violation is made by a respective application, which receives notification of the positive determination, and then evaluates the corresponding events to determine if the rule was violated.

Figure 5A:
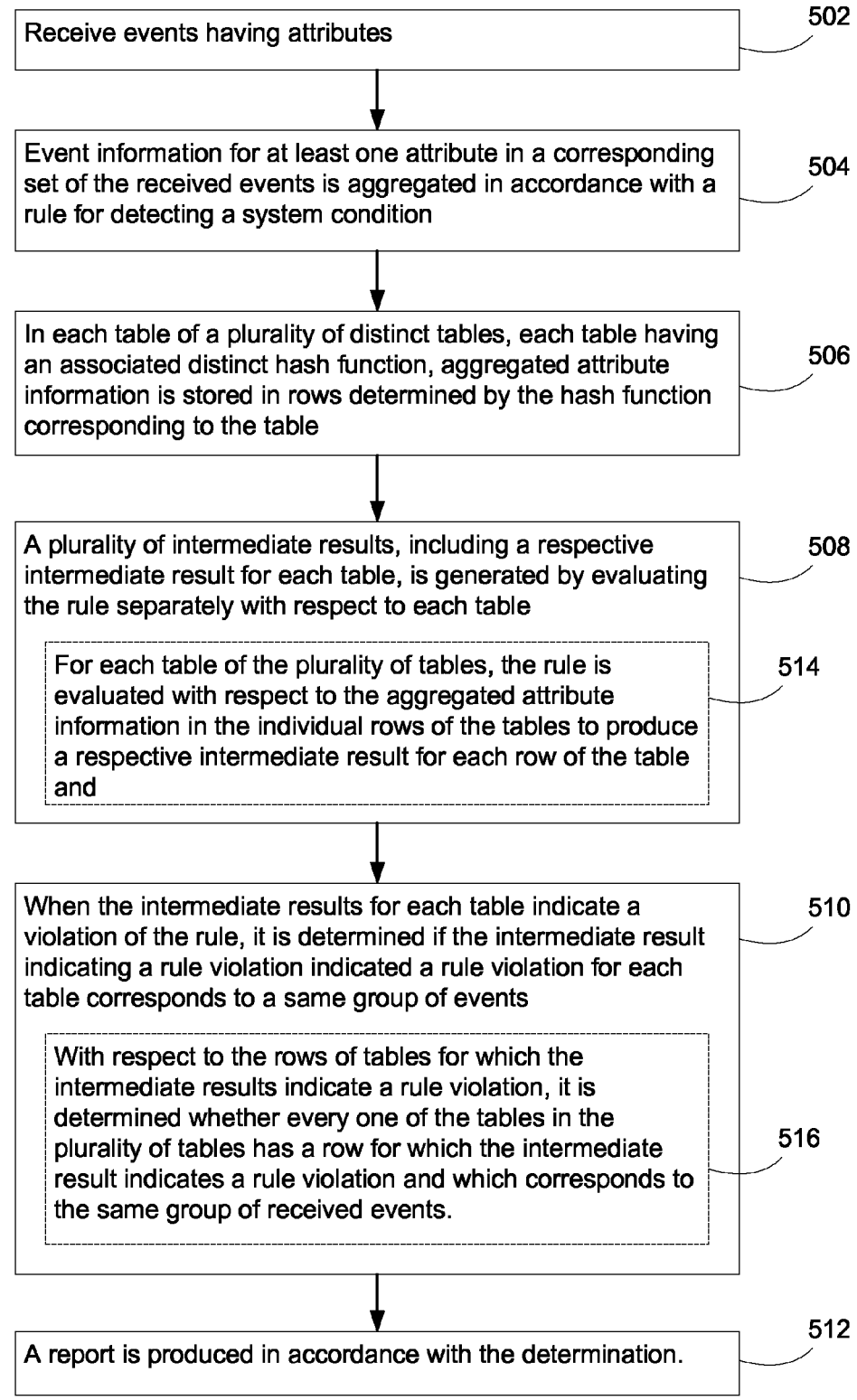

FIG. 5A is a flow chart of a process for collecting aggregated attribute information for received events, in accordance to some embodiments of the invention. Initially, events having attributes are received (502), at a worker node for example. Event information for at least one attribute in a corresponding set of the received events is aggregated in accordance with a rule for detecting a system condition (504). The aggregating includes storing aggregated attribute information in a plurality of tables, in rows determined by a hash function associated with each table (506). Each of the tables corresponds to the rule for which event information is being aggregated.

In some embodiments, as shown in FIG. 5B, each table of the plurality of tables includes a number of sub-tables corresponding to a number of predetermined time increments for a time window with each sub-table corresponding to a distinct time increment in the time window (518). Each sub-table in the plurality of tables stores aggregated attribute information corresponding to a time increment in the time window (518). Thus, aggregated attribute information is stored in sub-tables corresponding to a new time window in response to determining that the time window has expired (522). Optionally, the time window has duration greater than one minute (520).

Referring again to FIG. 5A, a plurality of intermediate results is generated by evaluating the rule separately with respect to each table that corresponds to the rule (508). The intermediate result include a respective intermediate result for each table that corresponds to the rule. When the intermediate results for each table indicate a violation of the rule, this indicates a potential violation of the rule. To determine if there has been an actual violation of the rule, it is determined if the intermediate result indicating a rule violation for each rule corresponds to a same group of events (510). A report is produced in accordance the determination (512). For example, the report may be generated by an application that receives a notification (e.g., 480, FIG. 4D) of a rule violation.

In some embodiments, as shown in FIG. 5A, for each table of the plurality of tables, the rule is evaluated with respect to the aggregated attribute information in individual rows of the tables to produce a respective intermediate result for each row of the table (514). With respect to the rows of tables for which the intermediate results indicate a rule violation, it is determined whether every one of the tables in the plurality of tables has a row for which the intermediate result indicates a rule violation and which corresponds to the same group of received events (516). More specifically, as shown in FIGS. 5H and 4D, when each of the tables in the plurality of tables has a row for which the intermediate results indicate a potential rule violation, the process identifies events (e.g., by obtaining event data using a reverse hash lookup, see 470-472, FIG. 4D) corresponding to the row in each of the tables for which the intermediate results indicates a potential rule violation (517). The process furthermore determines if the rule is violated by the identified events (517) (e.g., by analyzing the event data to determine whether the same group-by attribute was present in identified events for each of the tables, see 474-478, FIG. 4D). As noted above, positive determination at this point indicates that an actual violation of the rule has been detected. However, in some embodiments, some rules may require additional processing to determine that an actual violation of the rule has been detected, in which case the rule is further evaluated by a respective application.

Figure 5C:
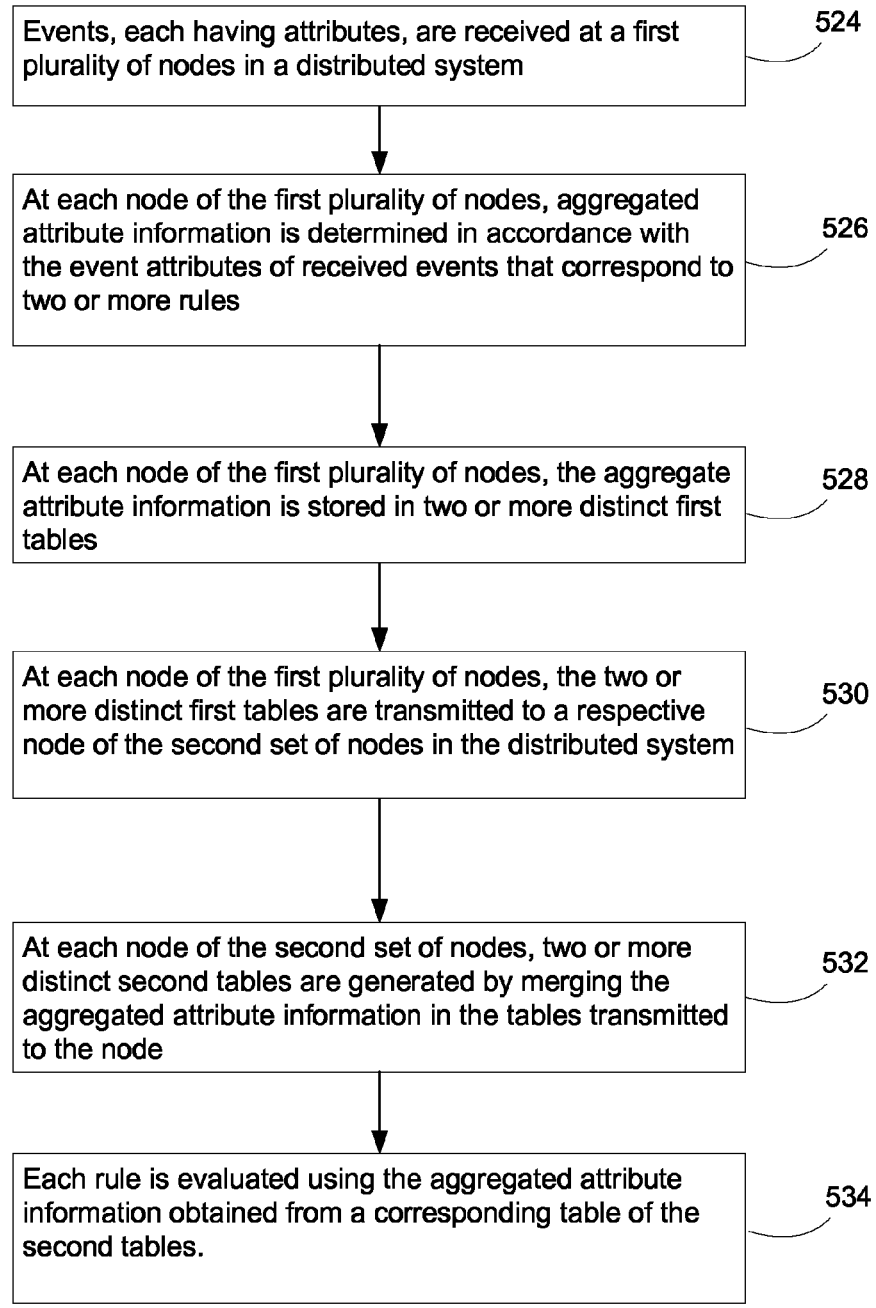
Figure 5D:
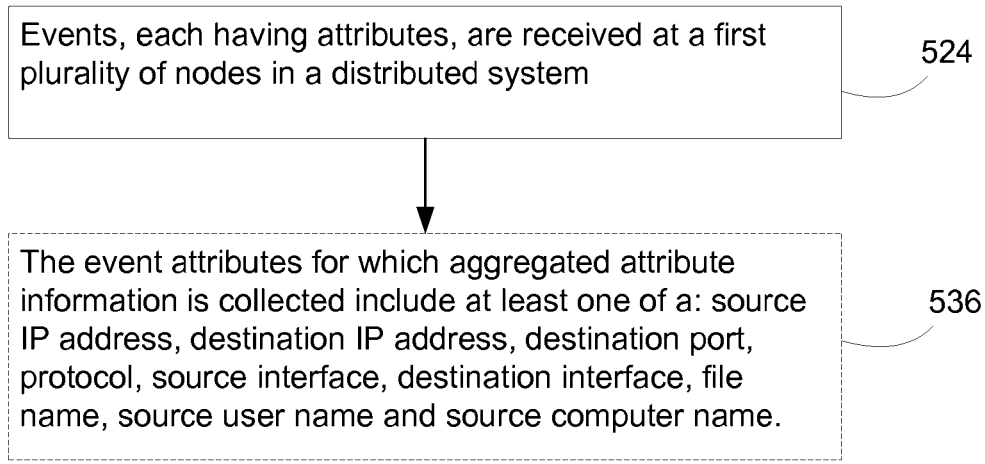
Figure 5E:
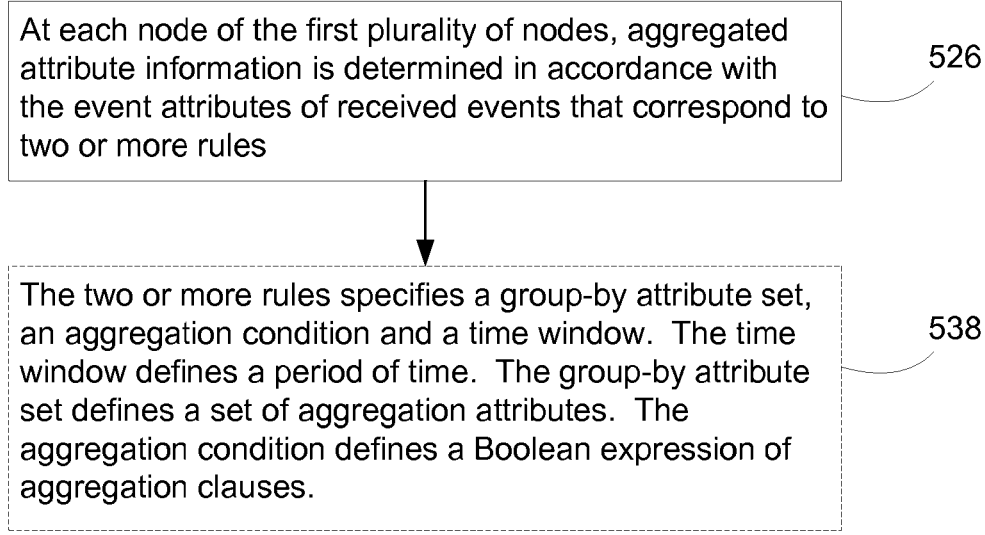

FIG. 5C is a flow chart of a process for collecting aggregated attribute information for received events, in accordance to some embodiments of the invention. Events, each having attributes, are received at a first plurality of nodes in a distributed system (524). In some embodiments, the event attributes for which aggregated attribute information is collected include at least one of a: source IP address, destination IP address, destination port, protocol, source interface, destination interface, file name, source user name and source computer name (536, FIG. 5D).

At each node of the first plurality of nodes, aggregated attribute information is determined in accordance with the event attributes of received events that correspond to two or more rules (526). Each of the rules specifies a group-by attribute set, an aggregation condition and a time window (538). The time window defines a period of time (538). The group-by attribute set defines a set of aggregation attributes (538). The aggregation condition defines a Boolean expression of aggregation clauses where each aggregation clause includes an aggregation attribute for which aggregated attribute information is to be stored in a respective table of the first tables (538).

Figure 5F:
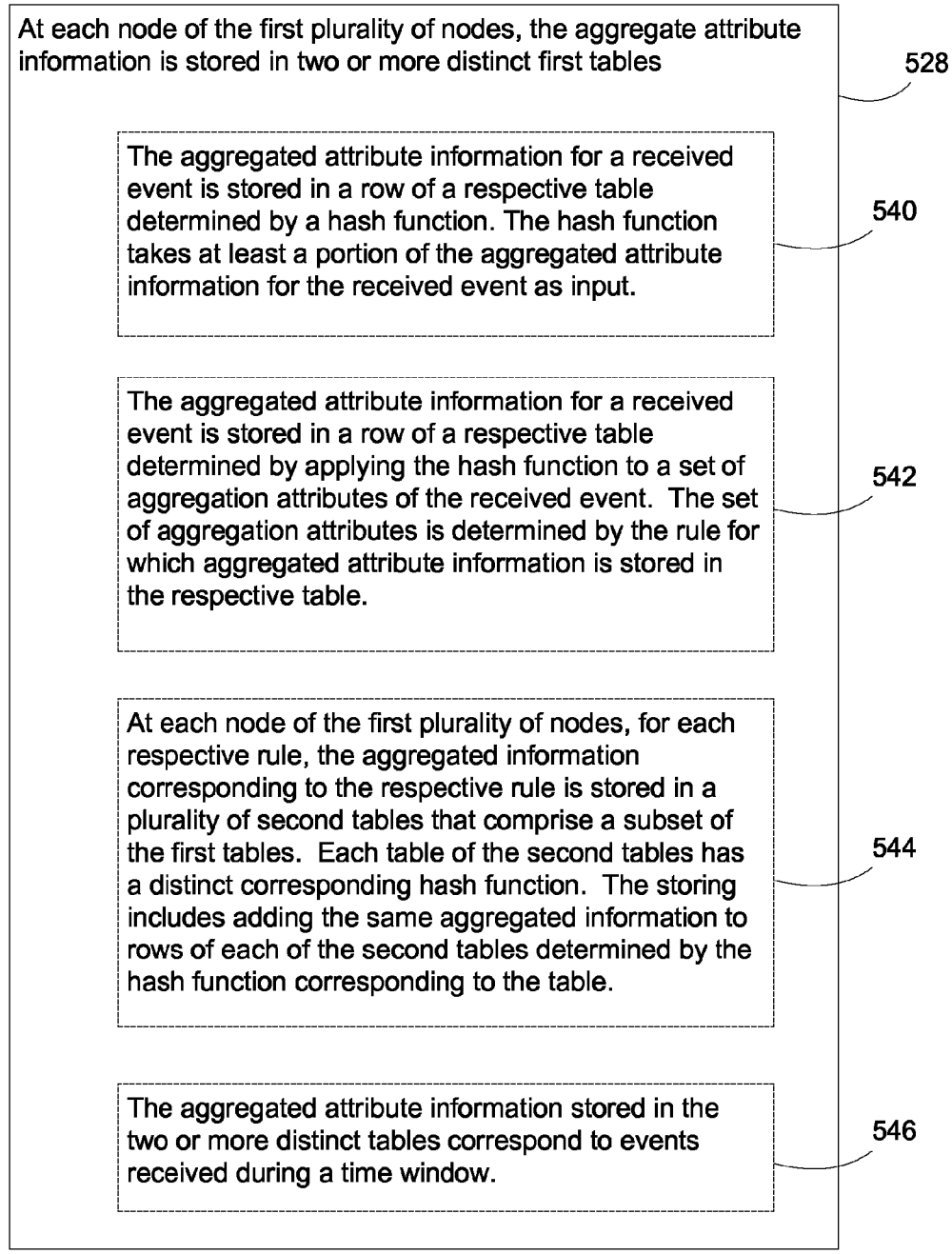

At each node of the first plurality of nodes, the aggregated attribute information is stored in two or more distinct first tables, each table storing aggregated attribute information for a respective rule of the two or more rules (528). In some embodiments, as shown in FIG. 5F, the aggregated attribute information for a received event is stored in a row of a respective table determined by a hash function (540). The hash function takes at least a portion of the aggregated attribute information for the received event as input (540). In some embodiments, the row in which to store the information is determined by applying the hash function to a set of aggregation attributes of the received event (542, FIG. 5F). The set of aggregation attributes (to which the hash function is applied) is determined by the rule for which aggregated attribute information is stored in the respective table (542, FIG. 5F).

In some embodiments, at each node of the first plurality of nodes, for each respective rule of the two or more rules, the aggregated information corresponding to the respective rule is stored in a plurality of second tables comprising a subset of the first tables (544, FIG. 5F). Each table of the second tables has a distinct corresponding hash function (544). The storing includes adding the same aggregate information to a respective row of each table of the plurality of second tables, determined by the hash function corresponding to the table (544). In some embodiments, the aggregated attribute information stored in the two or more distinct tables correspond to events received during the same time window (546, FIG. 5F).

At each node of the first plurality of nodes, the two or more distinct first tables are transmitted to a respective node of a second set of nodes in the distributed system (530, FIG. 5C). The second set of nodes comprise one or more nodes in the distributed system. For example, the second set of nodes can be the aggregation nodes 204 of FIGS. 1A and 2, or the second set of nodes can be the final aggregation node 202. At each node of the second set of nodes, two or more distinct second tables are generated by merging the aggregated attribute information in the tables transmitted to the node (532). Each rule of the two or more rules is evaluated using the aggregated attribute information obtained from a corresponding table of the second tables (534). For example, the process of FIG. 4D can be used to evaluate the two or more rules using the aggregated attribute information stored in tables of merged aggregated attribute information.

Figure 5G:
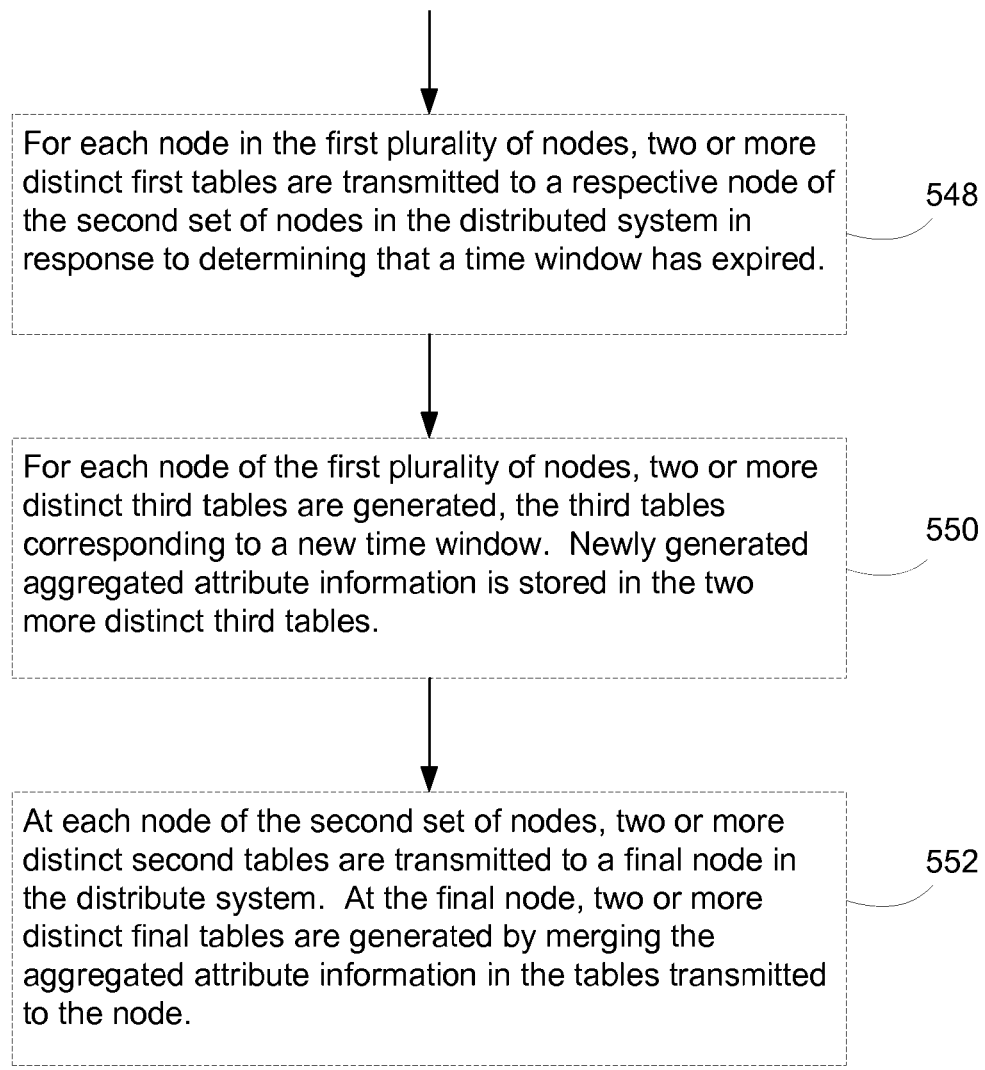

In some embodiments, as shown in FIG. 5G, each node in the first plurality of nodes, two or more distinct first tables are transmitted to a respective node of the second set of nodes in the distributed system in response to determining that a time window has expired (548). Optionally, two or more distinct third tables corresponding to a new time window are generated (550). Newly generated aggregated attribute information is stored in the two or more distinct third tables (550). Optionally, at each node of the second set of nodes, two or more distinct second tables are transmitted to a final node in the distributed system (552). At the final node, two or more distinct final tables are generated by merging the aggregated attribute information in the tables transmitted to the node (552). For example, FIG. 4C is a flow chart of a process for merging the aggregated attribute information in the tables transmitted to the final node.

Figure 6A:
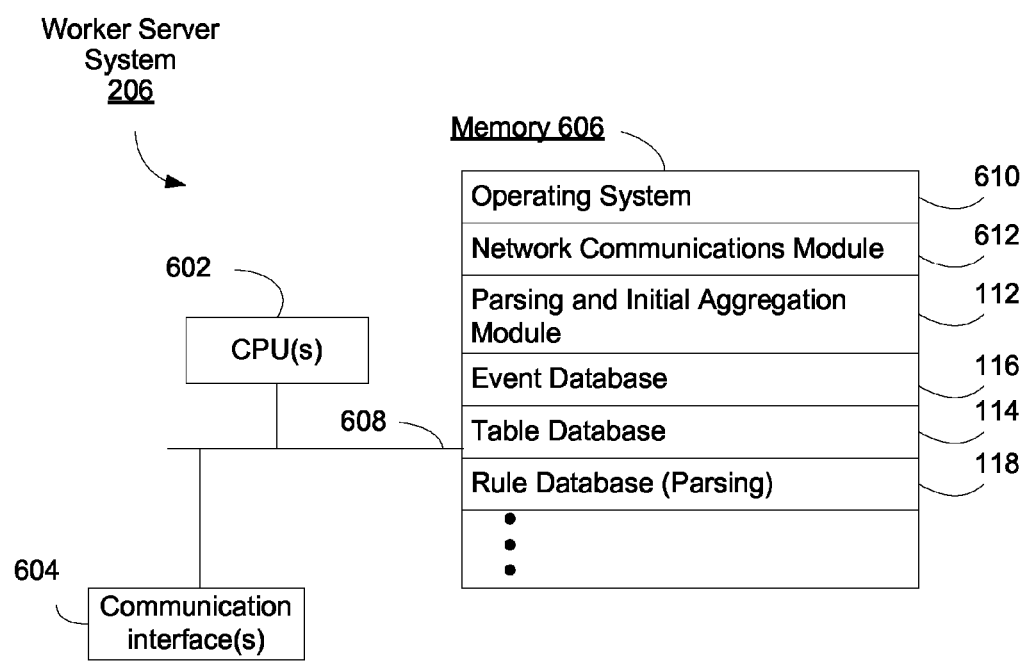
FIGS. 6A-6B are block diagrams illustrating worker, aggregator and final aggregator server systems, in accordance with some embodiments of the invention.

FIG. 6A is a block diagram illustrating a worker server system 206, in accordance with some embodiments of the present invention. The worker server system 206 typically includes one or more processing units (CPU's) 602, one or more network or other communications interfaces 604, memory 606, and one or more communication buses 608 for interconnecting these components. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU (s) 602. Memory 606, or alternatively the non-volatile memory device(s) within memory 606, comprises a computer readable storage medium. In some embodiments, memory 606 or the computer readable storage medium of memory 606 store the following programs, modules and data structures, or a subset thereof:

- an operating system 610 that includes procedures for handling various basic system services and for performing hardware dependent tasks;
- a network communication module 612 that is used for connecting to other computers via the one or more communication network interfaces 604 (wired or wireless) and one or more communication networks, such as the Internet, other wide area networks, local area networks, metropolitan area networks, and so on;
- a parsing and initial aggregation module 112 to perform the parsing of events and aggregating of event attribute information in accordance with a set of rules (see FIG. 4A, and 502-506 FIG. 5A);
- a table database 114 to store tables (e.g., 302, FIG. 3A) containing aggregated attribute information (see, for example, 528 in FIG. 5C);
- an event database 116 to store received events;
- a rule database 118 to store rules used for parsing events and aggregating attribute information (see, for example, 526 in FIG. 5C).

Each of the above identified elements may be stored in one or more of the previously mentioned memory devices (which together may comprise the aforementioned computer readable storage medium of memory 606), and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 606 may store a subset of the modules and data structures identified above. Furthermore, memory 606 may store additional modules and data structures not described above.

Although FIG. 6A shows a server system, FIG. 6A is intended more as functional description of the various features which may be present in a set of servers than as a structural schematic of the embodiments described herein. In practice, and as recognized by those of ordinary skill in the art, items shown separately could be combined and some items could be separated. For example, some items (e.g., parsing and initial aggregation module 112, event database 116, table database 114) shown separately in FIG. 6A could be implemented on single servers and single items could be implemented by one or more servers. The actual number of servers used to implement the worker server system 206 and how features are allocated among them will vary from one implementation to another, and may depend in part on the amount of data traffic that the system must handle during peak usage periods as well as during average usage periods.

Figure 6B:
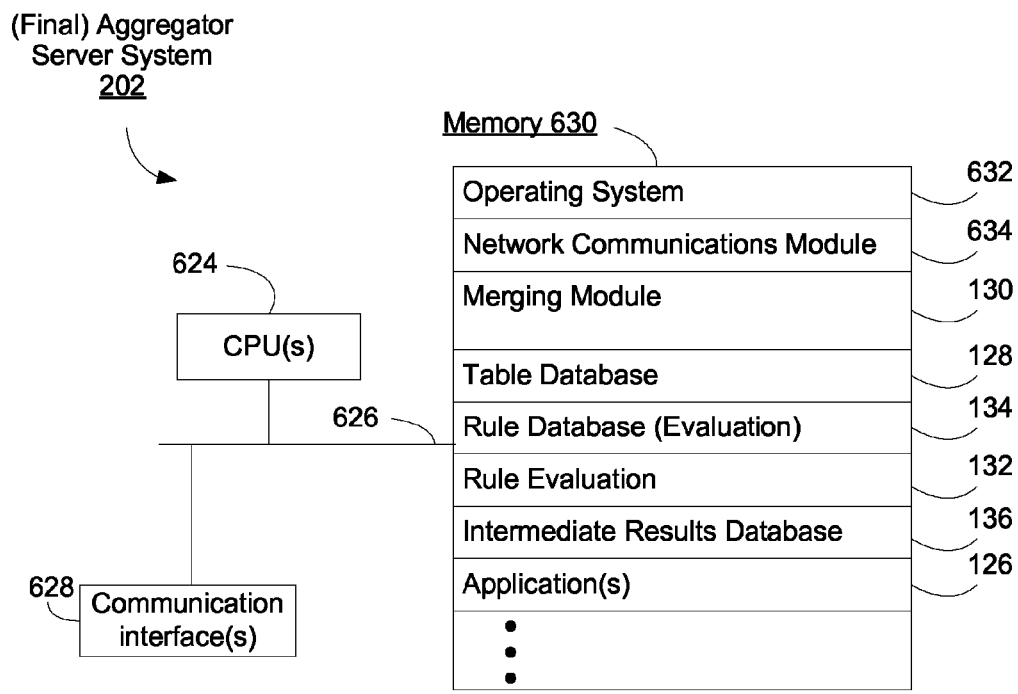

FIG. 6B is a block diagram illustrating a final aggregator system 202, in accordance with one embodiment of the present invention. The final aggregator system 202 typically includes one or more processing units (CPU's) 624, one or more network or other communications interfaces 628, memory 630, and one or more communication buses 626 for interconnecting these components. Memory 630 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 630 may optionally include one or more storage devices remotely located from the CPU(s) 624. Memory 630, or alternatively the non-volatile memory device(s) within memory 630, comprises a computer readable storage medium. In some embodiments, memory 630 or the computer readable storage medium of memory 630 store the following programs, modules and data structures, or a subset thereof:

- an operating system 632 that includes procedures for handling various basic system services and for performing hardware dependent tasks;
- a network communication module 634 that is used for connecting to other computers via the one or more communication network interfaces 604 (wired or wireless) and one or more communication networks, such as the Internet, other wide area networks, local area networks, metropolitan area networks, and the like;
- a merging module 130 to merge aggregated event attribute information received from worker or intermediate level aggregator systems (see, for example, FIG. 4C, and 552 in FIG. 5G);
- a table database 128 to store one or more tables of aggregated event attribute information (see, for example, 552 in FIG. 5G);
- a rule database 134 to store rules, which are evaluated using the aggregated event attribute information in corresponding tables of the table database 128 (see, for example, 504 and 508 in FIG. 5A);
- a rule evaluation module 132, to evaluate aggregate event attribute information in corresponding tables of the table database 128; (see, for example, 504 and 508 in FIG. 5A);
- a intermediate results database 136, to store intermediate results indicating rule violations (see, for example, 508 in FIG. 5A);
- applications 126, such as applications that receive notifications when rules in the rule database are triggered (see, for example, 512, FIG. 5A).

An aggregator server system 204 includes similar components as a final aggregator server system 202 except for the rule database 134, rule evaluation module 132, intermediate results database 136 and applications 126.

Each of the above identified elements may be stored in one or more of the previously mentioned memory devices (which together may comprise the aforementioned computer readable storage medium of memory 630), and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 630 may store a subset of the modules and data structures identified above. Furthermore, memory 630 may store additional modules and data structures not described above.

Although FIG. 6B shows a server system, FIG. 6B is intended more as functional description of the various features which may be present in a set of servers than as a structural schematic of the embodiments described herein. In practice, and as recognized by those of ordinary skill in the art, items shown separately could be combined and some items could be separated. For example, some items (e.g., merging module 130, table database 128, rule database 134) shown separately in FIG. 6B could be implemented on single servers and single items could be implemented by one or more servers. The actual number of servers used to implement the final aggregator server system 202 and how features are allocated among them will vary from one implementation to another, and may depend in part on the amount of data to be stored, and the amount of data traffic that the system must handle during peak usage periods as well as during average usage periods.

Each of the methods described herein may be governed by instructions that are stored in a computer readable storage medium and that are executed by one or more processors of one or more servers. Each of the operations shown in FIGS. 4A-4D and 5A-5G may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for collecting event information, comprising:
   receiving events at a first plurality of nodes in a distributed system, each event having attributes;
   for the events received at each node of the first plurality of nodes, determining aggregated attribute information corresponding to two or more rules;
   at each node of the first plurality of nodes, storing the aggregated attribute information in two or more distinct first tables, each table of the first tables storing aggregated attribute information for a different respective rule of the two or more rules;
   at each node of the first plurality of nodes, transmitting the two or more distinct first tables to a respective node of a second set of nodes in the distributed system, the second set of nodes comprising one or more nodes in the distributed system;
   at each node of the second set of nodes, generating two or more distinct second tables by merging the aggregated attribute information in the tables transmitted to the node, each table of the two or more second tables corresponding to a respective rule of the two or more rules; and
   evaluating each rule of the two or more rules using the aggregated attribute information obtained from a corresponding table of the second tables;
   wherein the aggregated attribute information for a received event is stored in a row of a respective table determined by a hash function, wherein the hash function takes as input at least a portion of the aggregated attribute information for the received event.

2. The method of claim 1, wherein the aggregated attribute information for a received event is stored in a row of the respective table determined by applying the hash function to a set of aggregation attributes of the received event, the set of aggregation attributes determined by the rule for which aggregated attribute information is stored in the respective table.

3. The method of claim 1, wherein at each node of the first plurality of nodes, for each respective rule of the two or more rules, storing the aggregated information corresponding to the respective rule in a plurality of third tables comprising a subset of the first tables, each table of the third tables having a distinct corresponding hash function; the storing including adding the same aggregated information to a respective row of each table of the plurality of third tables, wherein the respective row is determined by the hash function corresponding to the table.

4. The method of claim 1, wherein the aggregated attribute information stored in a respective set of two or more distinct tables correspond to events received during a time window.

5. The method of claim 1, including:
   for each node of the first plurality of nodes, determining that a time window has expired; and
   in response to the determination, transmitting the two or more distinct first tables to the respective node of the second set of nodes in the distributed system.

6. The method of claim 5, including:
   for each node of the first plurality of nodes, generating two or more distinct third tables, the third tables corresponding to a new time window; and
   storing aggregated attribute information in the two or more distinct third tables.

7. The method of claim 1, wherein each rule of the two or more rules specifies a group-by attribute set, an aggregation condition and a time window, the time window defining a period of time, the group-by attribute set defining a set of aggregation attributes, the aggregation condition defining a Boolean expression of aggregation clauses wherein each aggregation clause includes an aggregation attribute for which aggregated attribute information is to be stored in a respective table of the first tables.

8. The method of claim 1, including:
   at each node of the second set of nodes, transmitting the two or more distinct second tables to a final node in the distributed system; and
   at the final node, generating two or more distinct final tables by merging the aggregated attribute information in the tables transmitted to the node.

9. The method of claim 1, wherein the event attributes for which aggregated attribute information is determined includes at least one of: source IP address, destination IP address, destination port, protocol, source Interface, destination interface, file name, source user name, and source computer name.

10. The method of claim 1, wherein evaluating a respective rule includes:
    for each table of a fourth plurality of tables, comprising second tables that store aggregated attribute information for the respective rule, evaluating the respective rule with respect to the aggregated attribute information in individual rows of the table to produce a respective intermediate result for each row of the table; and
    identifying rows of the tables for which the intermediate results indicate a potential rule violation; and
    determining, with respect to the rows of the fourth plurality of tables for which the intermediate results indicate a potential rule violation, whether every one of the fourth plurality of tables has a row for which the intermediate result indicates a potential rule violation and which corresponds to a same group of received events.

11. The method of claim 10, including, when every one of the tables in the fourth plurality of tables has a row for which the intermediate results indicate a potential rule violation, identifying received events corresponding to the row in each of the fourth plurality of tables for which the intermediate results indicates a potential rule violation, and determining if the rule is violated by the identified events.

12. A server system, comprising:
    one or more processors;

memory storing one or more programs, the one or more programs including instructions, which when executed by the one or more processors, cause the server system to:
- receive events at a first plurality of nodes in a distributed system, each event having attributes;
- for the events received at each node of the first plurality of nodes, determine aggregated attribute information corresponding to two or more rules;
- at each node of the first plurality of nodes, store the aggregated attribute information in two or more distinct first tables, each table of the first tables storing aggregated attribute information for a different respective rule of the two or more rules;
- at each node of the first plurality of nodes, transmit the two or more distinct first tables to a respective node of a second set of nodes in the distributed system, the second set of nodes comprising one or more nodes in the distributed system;
- at each node of the second set of nodes, generate two or more distinct second tables by merging the aggregated attribute information in the tables transmitted to the node, each table of the two or more second tables corresponding to a respective rule of the two or more rules; and
- evaluate each rule of the two or more rules using the aggregated attribute information obtained from a corresponding table of the second tables;
- wherein the aggregated attribute information for a received event is stored in a row of a respective table determined by a hash function, wherein the hash function takes as input at least a portion of the aggregated attribute information for the received event.

13. A non-transitory computer readable storage medium storing the one or more programs including instructions, which when executed by one or more processors of a computer system, cause the computer system to:
- receive events at a first plurality of nodes in a distributed system, each event having attributes;
- for the events received at each node of the first plurality of nodes, determine aggregated attribute information corresponding to two or more rules;
- at each node of the first plurality of nodes, store the aggregated attribute information in two or more distinct first tables, each table of the first tables storing aggregated attribute information for a different respective rule of the two or more rules;
- at each node of the first plurality of nodes, transmit the two or more distinct first tables to a respective node of a second set of nodes in the distributed system, the second set of nodes comprising one or more nodes in the distributed system;
- at each node of the second set of nodes, generate two or more distinct second tables by merging the aggregated attribute information in the tables transmitted to the node, each table of the two or more second tables corresponding to a respective rule of the two or more rules; and
- evaluate each rule of the two or more rules using the aggregated attribute information obtained from a corresponding table of the second tables;
- wherein the aggregated attribute information for a received event is stored in a row of a respective table determined by a hash function, wherein the hash function takes as input at least a portion of the aggregated attribute information for the received event.

14. The non-transitory computer readable storage medium of claim 13, wherein each rule of the two or more rules specifies a group-by attribute set, an aggregation condition and a time window, the time window defining a period of time, the group-by attribute set defining a set of aggregation attributes, the aggregation condition defining a Boolean expression of aggregation clauses wherein each aggregation clause includes an aggregation attribute for which aggregated attribute information is to be stored in a respective table of the first tables.

15. The non-transitory computer readable storage medium of claim 13, wherein the aggregated attribute information for a received event is stored in a row of the respective table determined by applying the hash function to a set of aggregation attributes of the received event, the set of aggregation attributes determined by the rule for which aggregated attribute information is stored in the respective table.

16. The non-transitory computer readable storage medium of claim 13, wherein the one or more programs further include instructions, which when executed by the one or more processors, cause the computer system to store, at each node of the first plurality of nodes, for each respective rule of the two or more rules, the aggregated information corresponding to the respective rule in a plurality of third tables comprising a subset of the first tables, each table of the third tables having a distinct corresponding hash function; the storing including adding the same aggregated information to a respective row of each table of the plurality of third tables, wherein the respective row is determined by the hash function corresponding to the table.

17. The non-transitory computer readable storage medium of claim 13, wherein the aggregated attribute information stored in a respective set of two or more distinct tables correspond to events received during a time window.

18. The non-transitory computer readable storage medium of claim 13, wherein the one or more programs further include instructions, which when executed by the one or more processors, cause the computer system to:
- for each node of the first plurality of nodes, determine that a time window has expired; and
- in response to the determination, transmit the two or more distinct first tables to the respective node of the second set of nodes in the distributed system.

19. The server system of claim 12, wherein each rule of the two or more rules specifies a group-by attribute set, an aggregation condition and a time window, the time window defining a period of time, the group-by attribute set defining a set of aggregation attributes, the aggregation condition defining a Boolean expression of aggregation clauses wherein each aggregation clause includes an aggregation attribute for which aggregated attribute information is to be stored in a respective table of the first tables.

20. The server system of claim 12, wherein the aggregated attribute information for a received event is stored in a row of the respective table determined by applying the hash function to a set of aggregation attributes of the received event, the set of aggregation attributes determined by the rule for which aggregated attribute information is stored in the respective table.

21. The server system of claim 12, wherein the one or more programs further include instructions, which when executed by the one or more processors, cause the server system to store, at each node of the first plurality of nodes, for each respective rule of the two or more rules, the aggregated information corresponding to the respective rule in a plurality of third tables comprising a subset of the first tables, each table of the third tables having a distinct corresponding hash function; the storing including adding the same aggregated information to a respective row of each table of the plurality of third tables, wherein the respective row is determined by the hash function corresponding to the table.

22. The server system of claim 12, wherein the aggregated attribute information stored in a respective set of two or more distinct tables correspond to events received during a time window.

23. The server system of claim 12, wherein the one or more programs further include instructions, which when executed by the one or more processors, cause the server system to:
  for each node of the first plurality of nodes, determine that a time window has expired; and
  in response to the determination, transmit the two or more distinct first tables to the respective node of the second set of nodes in the distributed system.

24. The server system of claim 12, wherein the one or more programs include instructions for evaluating a respective rule by:
  for each table of a fourth plurality of tables, comprising second tables that store aggregated attribute information for the respective rule, evaluating the respective rule with respect to the aggregated attribute information in individual rows of the table to produce a respective intermediate result for each row of the table; and
  identifying rows of the tables for which the intermediate results indicate a potential rule violation; and
  determining, with respect to the rows of the fourth plurality of tables for which the intermediate results indicate a potential rule violation, whether every one of the fourth plurality of tables has a row for which the intermediate result indicates a potential rule violation and which corresponds to a same group of received events.

25. The server system of claim 24, wherein the one or more programs include instructions for identifying, when every one of the tables in the fourth plurality of tables has a row for which the intermediate results indicate a potential rule violation, received events corresponding to the row in each of the fourth plurality of tables for which the intermediate results indicates a potential rule violation, and determining if the rule is violated by the identified events.

26. The non-transitory computer readable storage medium of claim 13, wherein the one or more programs include instructions for evaluating a respective rule by:
  for each table of a fourth plurality of tables, comprising second tables that store aggregated attribute information for the respective rule, evaluating the respective rule with respect to the aggregated attribute information in individual rows of the table to produce a respective intermediate result for each row of the table; and
  identifying rows of the tables for which the intermediate results indicate a potential rule violation; and
  determining, with respect to the rows of the fourth plurality of tables for which the intermediate results indicate a potential rule violation, whether every one of the fourth plurality of tables has a row for which the intermediate result indicates a potential rule violation and which corresponds to a same group of received events.

27. The non-transitory computer readable storage medium of claim 26, wherein the one or more programs include instructions for identifying, when every one of the tables in the fourth plurality of tables has a row for which the intermediate results indicate a potential rule violation, received events corresponding to the row in each of the fourth plurality of tables for which the intermediate results indicates a potential rule violation, and determining if the rule is violated by the identified events.

* * * * *

UNITED STATES PATENT AND TRADEMARK OFFICE
CERTIFICATE OF CORRECTION

PATENT NO. : 8,510,432 B2
APPLICATION NO. : 12/822842
DATED : August 13, 2013
INVENTOR(S) : Bhattacharya et al.

Page 1 of 1

It is certified that error appears in the above-identified patent and that said Letters Patent is hereby corrected as shown below:

In the Specification

In Column 3, line 47, please delete "123" and add -- 124 --;

In Column 4, line 2, please delete "110" and add -- 126 --.

Signed and Sealed this
Twenty-fourth Day of September, 2013

Teresa Stanek Rea
*Deputy Director of the United States Patent and Trademark Office*